No. 706,242. Patented Aug. 5, 1902.
A. LATSHAW.
MEASURING RULE.
(Application filed Jan. 25, 1902.)
(No Model.)

WITNESSES.

INVENTOR.
Allen Latshaw.
By Allen B. Clements
Attorney.

UNITED STATES PATENT OFFICE.

ALLEN LATSHAW, OF PHILADELPHIA, PENNSYLVANIA.

MEASURING-RULE.

SPECIFICATION forming part of Letters Patent No. 706,242, dated August 5, 1902.

Application filed January 25, 1902. Serial No. 91,151. (No model.)

*To all whom it may concern:*

Be it known that I, ALLEN LATSHAW, a citizen of the United States, residing at No. 38 North Thirty-sixth street, Philadelphia, in the county of Philadelphia and State of Pennsylvania, have invented a new and useful System, to be called a "Measuring-Rule," for the Graduation of Rules, Scales, and Instruments for Linear Measurements, of which the following is a specification.

My invention relates to improvements in the graduation or marking of rules, scales, instruments, and apparatus for linear measurements.

The objects of my improvement are, first, to facilitate the reading of the units and the fractional parts of the respective units; second, to show the linear dimensions of the units and of their fractional parts over both obstructed and unobstructed surfaces; third, to illustrate the principles and values of fractions and mixed numbers for school and kindred purposes; fourth, graphically to show the relations of fractions and mixed numbers to each other and to the unit for school and kindred purposes. I attain these objects by the system of graduation illustrated in the accompanying drawings, in which—

Figure 1:
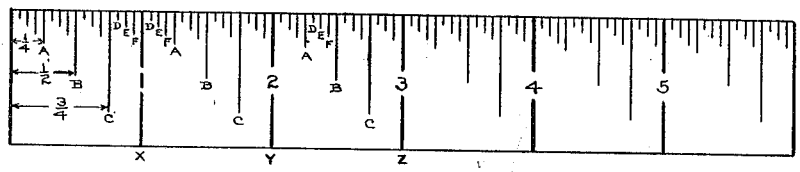
Figure 2:
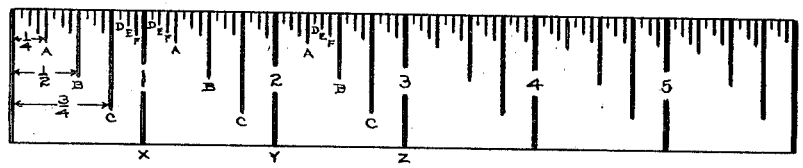

Figure 1 shows a plan view of a measuring-rule with graduations embodying my improvements. Fig. 2 shows the same with modifications as to the widths of the respective lines of graduation.

For illustrative purposes we will assume the rule to be six inches long, one inch wide, and divided into units of one inch. The denomination of the principal fraction of the unit is the fourth, which again has been subdivided into fourths, thus giving halves, quarters, eighths, and sixteenths as fractions of the unit.

Each unit of the decisive measuring-rule shall be marked off by a line, as X Y Z, &c., in the figure, drawn at right angles to the longitudinal edge of the rule or scale. Said line shall extend across the rule or scale except for a break or space sufficient in size to admit a figure or number. The respective units of the said rule or scale shall be divided and subdivided into fractional parts of any denominations by lines, as A B C D E F, &c., in the figure, drawn at right angles from the upper edge of the rule when the reading end of the rule or scale is at the left. The lengths of said lines (and the widths, if considered desirable) shall be governed by their positions with respect to the reading end of the rule, the unit, or the principal fractional division of the unit—that is to say, as in the figure, where the fourth is the denomination of the principal fraction of the unit, the line marked A at a distance of one-fourth of the value of the unit from the reading end of the rule (or any unit) shall be equal in length to one-fourth of the width of the rule, the line marked B at a distance of one-half of the value of the unit from the reading end of the rule (or any unit) shall be equal in length to one-half of the width of the rule and shall or may be twice as wide as the said line marked A, and the line marked C at a distance of three-fourths of the value of the unit from the reading end of the rule (or any unit) shall be equal in length to three-fourths of the width of the rule and shall or may be of a fixed width with respect to the said line marked A. The principal fractions shall or may be divided into fractional parts, preferably of the same denomination as that into which the units have been divided. These lines marking the subdivisions of the units shall be of dimensions determined upon the principles above stated—that is to say, as in the figure, the line marked D at a distance of one-sixteenth of the value of the unit from the reading end of the rule (a unit or a principal fractional division of a unit) shall be equal in length to one-sixteenth of the width of the rule. In like manner a line, as E, marking an eighth part of any unit, as aforesaid, shall be equal in length to one-eighth of the width of the rule and a line, as F, marking three-sixteenths of any unit, as aforesaid, shall be equal in length to three-sixteenths of the width of the rule.

Fig. 2 shows a rule drawn under the same conditions as in Fig. 1, but having this modification—to wit, the widths of the respective lines are in a ratio with their respective readings.

The decisive measuring-rule shall be printed, engraved, stamped, etched, photographed, or marked on paper, tape, wood, glass, celluloid, metal, or such other materials as its various and varied uses shall require.

I am aware that prior to my invention scales, rules, and graduated instruments have been made with the units and various divisions marked by lines of different dimensions, respectively; but I am not aware that lengths of said lines have ever been made dependent upon the readings they represented in terms of the width of the rule or scale upon which they are marked.

What I claim as my invention, and desire to secure by Letters Patent, is—

A measuring-rule having units whereof each is divided by graduation-lines, which are equal in length to the fractional part of the unit which each line represents, and each of said divisions being subdivided by graduation-lines, which are equal in length to the fractional part of the division which each line represents, substantially as described.

In testimony whereof I have signed my name to this specification in the presence of two subscribing witnesses.

ALLEN LATSHAW.

Witnesses:
H. A. CANNON,
ALLEN B. CLEMENT.